US012456455B2

(12) United States Patent
Chadwick et al.

(10) Patent No.: US 12,456,455 B2
(45) Date of Patent: Oct. 28, 2025

(54) NATURAL-LANGUAGE BASED ORDER PROCESSING

(71) Applicant: NCR Voyix Corporation, Atlanta, GA (US)

(72) Inventors: Emma Marie Chadwick, Atlanta, GA (US); Trisha Bhandary, Atlanta, GA (US); Vishal Bilagi, Atlanta, GA (US); T'Avvion Jones, Mableton, GA (US); Harnoor Singh, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 458 days.

(21) Appl. No.: 17/500,187

(22) Filed: Oct. 13, 2021

(65) Prior Publication Data

US 2023/0114834 A1  Apr. 13, 2023

(51) Int. Cl.
*G10L 15/08* (2006.01)
*G06F 40/42* (2020.01)
*G10L 15/22* (2006.01)
*G10L 15/26* (2006.01)
*G10L 19/00* (2013.01)

(52) U.S. Cl.
CPC .............. *G10L 15/08* (2013.01); *G06F 40/42* (2020.01); *G10L 15/22* (2013.01); *G10L 15/26* (2013.01); *G10L 19/0018* (2013.01); *G10L 2015/223* (2013.01)

(58) Field of Classification Search
CPC ......... G10L 15/08; G10L 15/22; G10L 15/26; G10L 19/001; G06F 3/167; G06Q 50/12
See application file for complete search history.

(56) References Cited

U.S. PATENT DOCUMENTS

| | | | |
|---|---|---|---|
| 7,669,757 B1* | 3/2010 | Crews | G06Q 20/20 705/16 |
| 9,323,854 B2* | 4/2016 | Massuh | G06F 40/58 |
| 2005/0049922 A1* | 3/2005 | Kargman | G06Q 50/12 705/15 |
| 2007/0073597 A1* | 3/2007 | Grubbs | G06Q 30/06 705/26.1 |
| 2009/0084840 A1* | 4/2009 | Williams | G06Q 30/00 235/379 |
| 2018/0068357 A1* | 3/2018 | High | G06Q 30/0281 |

(Continued)

OTHER PUBLICATIONS

Starbuck Rewards Terms of Use (Sep. 28, 2021)—As cited with the Wayback Machine (Year: 2021).*

(Continued)

*Primary Examiner* — Jesse S Pullias
(74) *Attorney, Agent, or Firm* — Schwegman Lundberg & Woessner, P.A.

(57) ABSTRACT

A customer is detected at a drive-thru and a natural language voice dialogue session is established with the customer. The customer provides voice inquiries and order details via speech during the session, the speech is translated to text sentences, and commands are issued to a transaction system through an Application Programming Interface (API) based on the text of the sentences. The transaction system updates a display associated with the drive-thru based on the commands processed for the session and places an order for the customer with a Point-Of-Sale (POS) terminal associated with the drive-thru based on the order details.

19 Claims, 3 Drawing Sheets

(56) References Cited

U.S. PATENT DOCUMENTS

2018/0174595 A1* 6/2018 Dirac .................... G10L 21/013
2020/0311804 A1* 10/2020 Buckholdt ......... G06Q 30/0641
2022/0270591 A1* 8/2022 Shukla .................... G06F 18/22

OTHER PUBLICATIONS

Castillo, Allysa Mae M., et al. "Improving Fast-Food Restaurants' Method of Operation: Automated Drive-Through Ordering System.", Int'l Conf. on Indus. Eng'g. and Ops. Management, Mar. 2020, pp. 1838-1849 (Year: 2020).*

* cited by examiner

NATURAL-LANGUAGE BASED ORDER PROCESSING

BACKGROUND

During 2020, the average wait time for drive-thrus increased to 4 minutes and 50 seconds, which is a 27% increase compared to 2019. In addition, the fast-food worker attrition rate increased to 5.6% from 2019 to 2020 resulting in an industry crises.

The COVID-19 pandemic is likely to show that the attrition rate grew exponentially from 2021 to 2022. In fact, during much of 2021 venturing out to a fast-food restaurant for carryout was a hit and miss proposition as many businesses unexpectedly closed or reduced hours because of the lack of available staff. Any staff that was available during 2020 was stretched way too thin resulting in exponential increases in average wait times and resulting in further worker burnout and attrition.

Businesses are struggling to achieve sufficient staffing levels necessary to satisfy customer demand as the public comes out of government mandated lockdowns and business closures. Most fast-food businesses have significantly increased staff salaries and substantially expanded worker benefits in 2021 to decrease worker attrition rates and to reach acceptable staffing levels; yet nearly every fast-food business is still hiring and cannot backfill for workers that leave let alone fill new positions necessary to meet the present customer demand.

Customers have become frustrated with the level of service that the businesses are providing them and there is some indications that historical demand levels are now subsiding/waning. No customer wants to wait in a drive-thru line for a half an hour or more only to receive an incorrect order, which, unfortunately, is far to common right now in the industry. Businesses fear that many of these loyal customers will not return. Even before the pandemic businesses were struggling with sufficient customer service and staff training/competency.

SUMMARY

In various embodiments, a system and methods for natural-language based order processing are provided.

According to an embodiment, a method for natural-language based order processing is presented. A presence of a customer is detected at a device and a natural-language voice dialogue is initiated with the customer during a session based on the presence. Voice statements of the customer are translated during the session to order details of an order and the order is placed with a transaction system associated with the device based on the order details.

DETAILED DESCRIPTION

Figure 1:
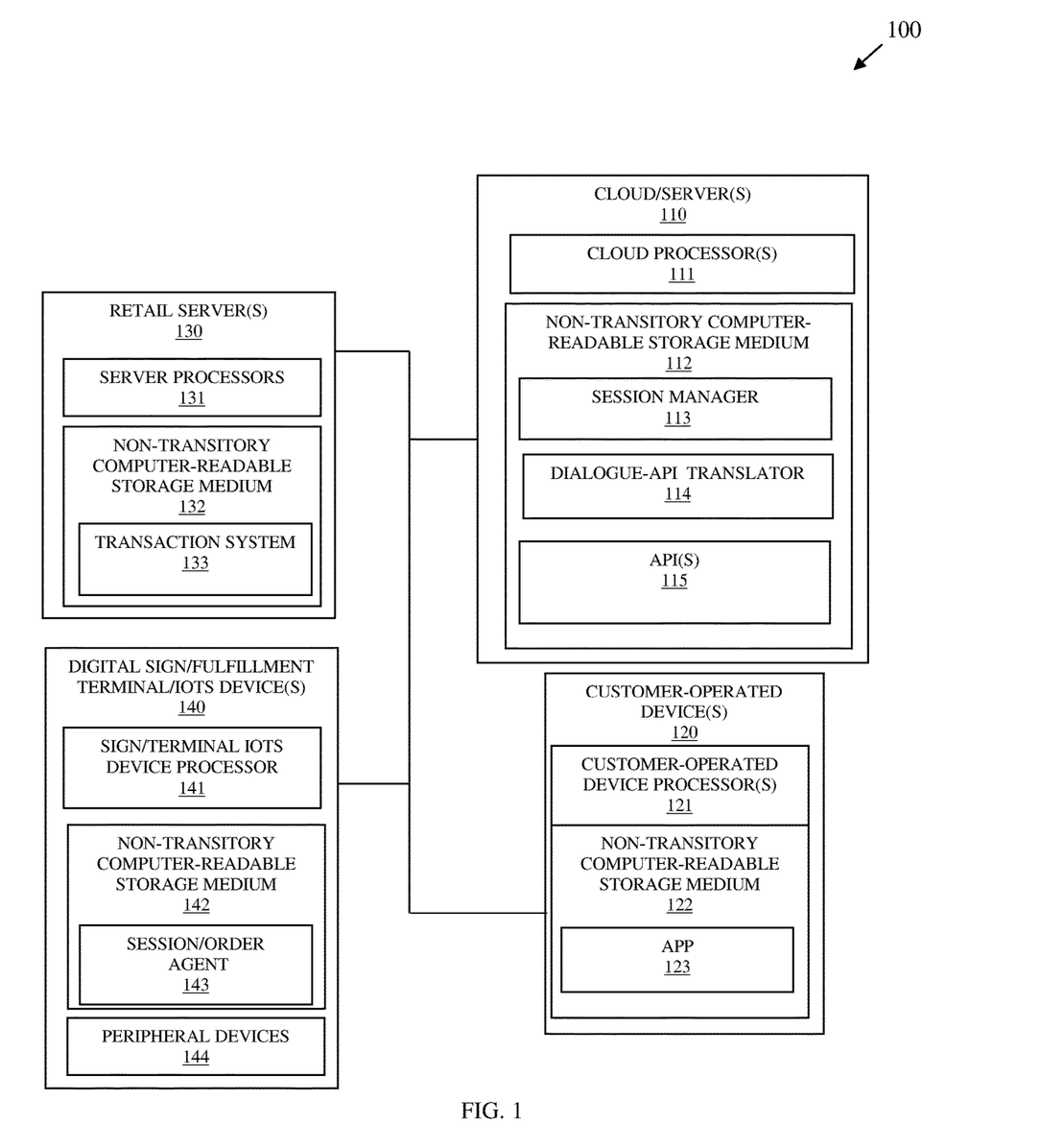
FIG. 1 is a diagram of a system for natural-language based order processing, according to an example embodiment.

FIG. 1 is a diagram of a system/platform 100 for natural-language based order processing, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of natural-language based order processing, presented herein and below.

System/platform 100 (herein after just "system 100") provides a processing environment by which natural language orders are processed through digital signs/Internet-of-Things (IoTs) devices from voice conversations with customers. A communication session with the user is established via speech (audio) captured by a speaker of the digital sign/IoTs device. The speech is translated into a natural language text dialogue that comprises commands associated with an order workflow of a retail store where the customer is ordering. The commands for the workflow are sent to a transaction system of the retailer for placing and processing the order via Application Programming Interface (API) calls. The transaction system interacts with fulfillment terminals at the store to communicate the order and order details for fulfillment and delivery to the customer. In an embodiment, the translation of the dialogue to text can be translated via a third-party API for a voice-to-text and text-to-voice service, such as Microsoft Azure Precept®. In an embodiment, in addition to taking and placing the order on behalf of the customer, system 100 can facilitate or initiate payment of the order with the transaction system, through a customer-provided Quick-Response (QR) code presented for scanning by a camera of the digital sign/IoTs device and further interaction with the retailer's transaction system via the API calls.

As used herein, the terms "customer," "consumer," and/or "user" may be used interchangeably and synonymously herein and below. This refers to an individual that has is placing an order with a retail store via a digital sign/IoTs device.

System 100 comprises a cloud/server 110, a plurality of user-operated devices 120, one or more retail servers 130, and a plurality of digital signs/fulfillment terminals/IoTs devices (herein after just "devices 140").

Cloud/Server 110 comprises at least one processor 111 of cloud/server 100 and a non-transitory computer-readable storage medium 112 of cloud/server 100. Medium 112 comprises executable instructions for a session manager 113, a dialogue-API translator 114, and API 115. The executable instructions when provided to and executed by processor 111 from medium 112 cause processor 111 to perform the processing discussed herein and below for session manager 113, dialogue-API translator 114, and API 115.

Each customer-operated user operated device 120 (hereinafter just "customer device 120") comprises at least one processor 121 of customer device 120 and a non-transitory computer-readable storage medium 122 of customer device. Medium 122 comprises executable instructions for a mobile application (app) 123. The executable instructions when provided to and executed by processor 121 from medium 122 cause processor 121 to perform the processing discussed herein and below for app 123.

Each retail server 130 comprises at least one processor 131 of retail server 130 and a non-transitory computer-readable storage medium 132 of retail server 130. Medium 132 comprises executable instructions for a transaction system 133. The executable instructions when provided to and executed by processor 131 from medium 132 cause processor 131 to perform the processing discussed herein and below for transaction system 133.

Each digital sign/fulfillment terminal/IoTs device 140 comprises at least one processor 141 of digital sign/fulfillment terminal/IoTs device 140, a non-transitory computer-readable storage medium 142 of digital sign/fulfillment terminal/IoTs device 140, and a variety of peripheral devices 144. Medium 142 comprises executable instructions for a session/order agent 143. The executable instructions when provided to and executed by processor 141 from medium 142 cause processor 141 to perform the processing discussed herein and below for session/order agent 143.

Conventional drive through ordering works by relaying a voice order of a customer from a drive-thru terminal to an attendant that operates a Point-Of-Sale (POS) terminal within a store associated with the drive-thru. Typically, the attendant has a headset on with a microphone so that the attendant can move around and assist in filing orders while taking drive-thru orders. The attendant then enters the voice order into the POS terminal which initiates a workflow that queues the customer's order for fulfillment by kitchen staff of the store. Most POS terminals associated with drive-thru orders are placed within or adjacent to the kitchen at fast food stores. The quarters are already tight for the staff and they frequently bump into one another. Some staff is dedicated to preparing customer orders, some staff dedicated to drive-thru orders, and some staff dedicated to taking in-store orders. As stated above, retailers are struggling with rising employee costs, inflation, and staffing shortages. System 100 remedies the staffing shortages by processing drive-thru orders remotely and automatically using natural-language dialogues with the customers, such that retail stores can focus on order preparation and eliminate order taking and order entry at their stores.

Digital sign/Fulfillment terminal/IoTs device 140 can be a plurality of different devices present at a retail store, such as a drive-thru display device equipped with at least a microphone and a speaker, and optionally a camera. Digital sign/Fulfillment terminal/IoTs device 140 may also be a POS terminal situated within the store and interfaced to transaction system 133. Digital sign/Fulfillment terminal/IoTs device 140 may also be a smart digital sign that displays order details for customer orders taken by transaction system 133 and that permits a touch or keyboard interface for staff to indicate when orders were completed for delivery to the customers. Digital sign/Fulfillment terminal/IoTs device 140 may also be a IoTs device interfaced to a display, a microphone, a speaker, and, optionally, a camera and/or a motion sensor.

Session/Order agent 143 detects when a customer is present in front of a display associated with a drive-thru of a retail store (e.g., fast food store). The customer's presence can be detected in a variety of manners. For example, a motion sensor can be triggered, an image captured by a camera of digital sign/fulfillment terminal/IoTs device 140 can identify from the image a car, a customer may speak into a microphone associated with digital sign/fulfillment terminal/IoTs device 140 and the audio detected via a speaker of device 140. In another case, a camera not directly interfaced to digital sign/fulfillment terminal/IoTs device 140 may capture an image that shows a car in front of a display of digital sign/fulfillment terminal/IoTs device 140. The images captured by such a camera available to session/order agent 143 and/or session manager 113 for purposes of determining that a customer is present at digital sign/fulfillment terminal/IoTs device 140.

Session/Order agent 143 may be configured to send an event notification to session manager 113 upon detection of a customer at digital sign/fulfillment terminal/IoTs device 140. Alternatively, session manager 113 utilizing network accessible audio and video captured at or in a vicinity of digital sign/fulfillment terminal/IoTs device 140 independently determines that a customer is at digital sign/fulfillment terminal/IoTs device 140 based on evaluation of the audio data and video data.

Once session manager 113 determines a customer is present at digital sign/fulfillment terminal/IoTs device 140, session manager 113 establishes a natural language voice session or dialogue with the customer through the microphone and speakers associated with digital sign/fulfillment terminal/IoTs device 140. Audio received during the dialogue is provided to dialogue-API translator 114, which converts the audio speech of the customer into text structured sentences or text commands. Again, dialogue-API translator 114 may use an API 115 and a third-party Artificial Intelligence (AI) speech-to-text translator service, such as Microsoft Precept®.

When the session manager 113 establishes a voice session with a customer, session manager 113 uses APIs 115 to instruct transaction system 133 to being an order for a customer at a retail store associated with digital sign/fulfillment terminal/IoTs device 140. This causes a menu of items associated with the store to be rendered and presented on a display associated with device 140 for customer viewing (assuming the menu was not already displayed before the customer was detected at digital sign/fulfillment terminal/IoTs device 140).

Session manager 113 may then play a natural language greeting to the customer over a speaker associated with device 140 that welcomes the customer and asks "What would you would like to order today?" The customer responds in speech picked up through a microphone associated with digital sign/fulfillment terminal/IoTs device 140, relayed to session manager 113, provided to dialogue-API translator 114, and session manager 113 receives text sentences or commands provided by the customer. The customer may issue questions rather than provided order details, such as what kinds of drinks are available to order or are their any combo deals today. Session manager 113 uses the text sentences provided by translator 114 to determine commands versus queries of the customer. Any queries are made to transaction system 133 by session manager 113 using API 115 along with the order number (assigned by transaction system 133 when the session was established) and the search terms of the query; results of the query, such as a listing of drinks available or a listing of today's combo meals are sent to order agent 143 and presented on the display of digital sign/fulfillment terminal/IoTs device 140. A text version of the returned listing may also be provided by transaction system 133 back to session manager 113 using API 115. Session manager 113 may then read the options over the speaker of digital sign/fulfillment terminal/IoTs device 140 to the customer in addition to the listing being presented on the display of digital sign/fulfillment terminal/IoTs device 140.

As the customer uses speech during the dialogue with session manager 113, items are ordered. Session manager 113 uses API 115 to interact with transaction system 133 to cause each ordered item and a pending total of the order to be presented on the display of digital sign/fulfillment terminal/IoTs device 140 to the customer.

During the dialogue, the customer may remove ordered items and/or add additional order items. Again, interaction between session manager 113 and transaction system 133 causes transaction system 133 to interact with order agent 143 and keep information about the order up-to-date on the display of digital sign/fulfillment terminal/IoTs device 140 for customer review and any further customer changes desired by the customer.

Once order details for the order are confirmed by the customer through the dialogue with session manager 113, session manager 113 uses API 115 to instruct transaction system 133 to place the order with a POS terminal 140 associated with the store where digital sign/fulfillment terminal/IoTs device 140 is located. Transaction system 133 sends a confirmation back to session manager 113. Session manager 113 plays speech over a speaker of digital sign/fulfillment terminal/IoTs device 140 that instructs the customer to pull forward or to pull into a designated parking spot to await delivery of the order.

Payment for the order can occur in a conventional manner by the customer pulling forward to pay an attendant at a drive-thru window with a customer-preferred method of payment.

In an embodiment, digital sign/fulfillment terminal/IoTs device 140 comprises a card reader (contact-based or contactless) that the customer can use with the card reader to make payment for the order.

In an embodiment, the customer may present a QR code on a screen of the customer-operated device 120 for capturing by a camera of digital sign/fulfillment terminal/IoTs device 140. The QR code representing encoded loyalty information of the customer with cloud/server 100 and/or with the retailer associated with the store and server 130. Mobile application (app) 123 may provide access to the QR code for presentation on the display of customer-operated device 120. The loyalty information comprises a registered payment card linked to the customer. Manager 113 receives an image of the QR code, decodes it to obtain the loyalty account of the customer, and obtains the registered payment card details. Alternatively, manager 113 provides the QR code to transaction system 133 using API 115; transaction system 133 decodes it to obtain the loyalty account of the customer and obtains the registered payment card details. When the loyalty information is associated with cloud/server 100, manager 113 provides the registered payment card details to transaction system 133 using the API 115. Transaction system 133 processes the registered payment card details to obtain a confirmation of payment from a payment service linked to the registered payment card details.

In an embodiment, depending on the geographic location of any given store, dialogue-API translator 114 may be trained on specific dialects and accents known to be used by people residing in that geographic location. Session manager 113 provides a location identifier as a parameter to dialogue-API translator 114. Dialogue-API translator 114 uses the location identifier to determine a specific location dialect or accent. This can also be used to change the spoken language, such that when the store is located in France, translator uses French to translate the audio of the customer into text.

In an embodiment, digital sign/fulfillment terminal/IoTs device 140 comprises an integrated deposit peripheral device 144 that permits customer payment by cash and dispenses change to the customer in cash and coins.

In an embodiment, session manager 113, dialogue-API translator 114, and APIs 115 are subsumed into and processed on a specific retailer's server 130.

The above-referenced embodiments and other embodiments are now presented and discussed with reference to FIGS. 2-3.

Figure 2:
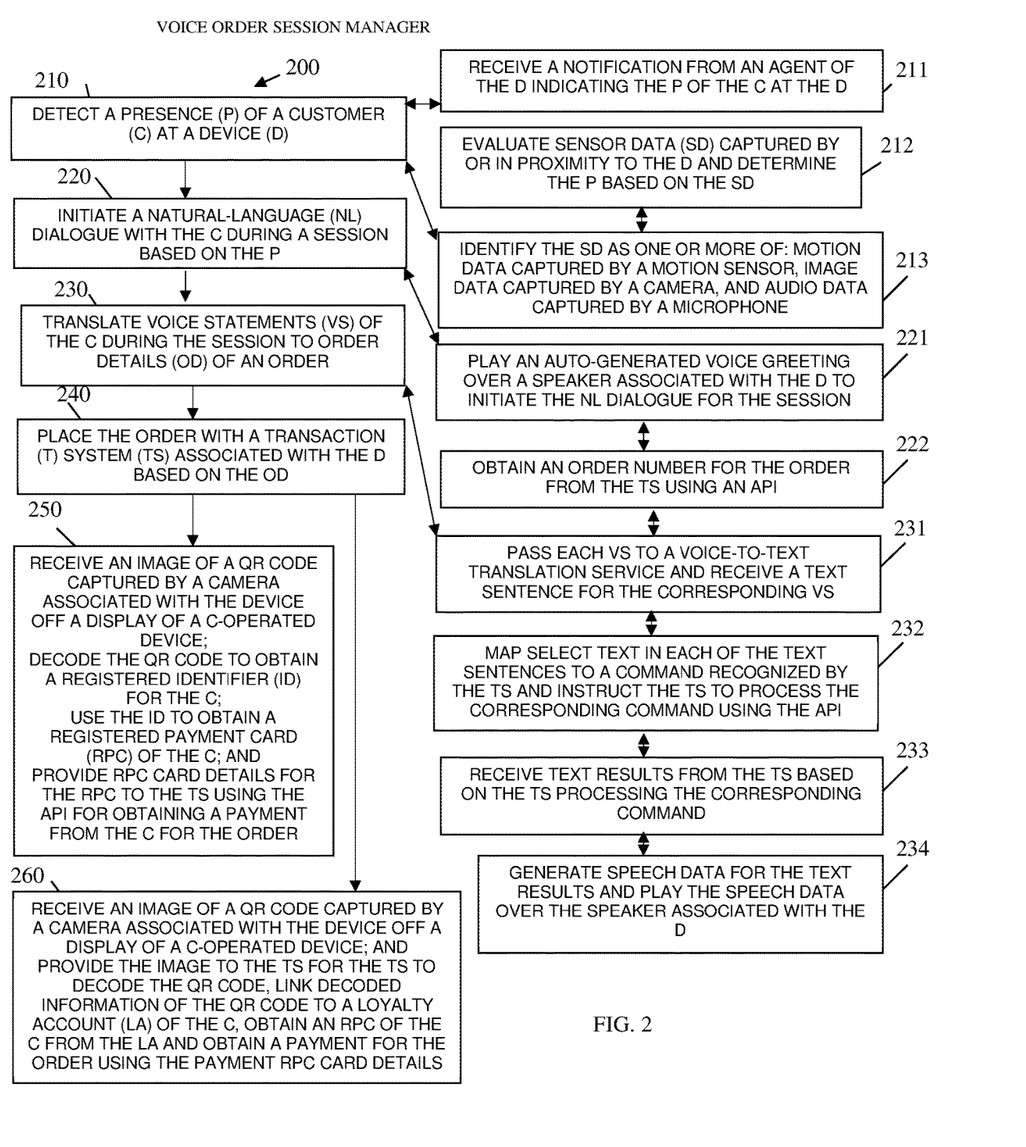
FIG. 2 is a diagram of a method for natural-language based order processing, according to an example embodiment.

FIG. 2 is a diagram of a method 200 for natural-language based order processing, according to an example embodiment. The software module(s) that implements the method 200 is referred to as an "voice order session manager 200." The voice order session manager 200 is implemented as executable instructions programmed and residing within memory and/or a non-transitory computer-readable (processor-readable) storage medium 112 and executed by one or more processors 111 of cloud/server 100. The processor(s) 111 of the cloud/server 100 that executes the voice order session manager 200 is specifically configured and programmed to process the voice order session manager 200. The voice order session manager 200 may have access to one or more network connections during its processing. The network connections can be wired, wireless, or a combination of wired and wireless.

In an embodiment, the cloud/server 100 executes the voice order session manager 200. Cloud/Server 100 comprises a plurality of servers 100 logically cooperating and accessible as a single server 110 (cloud 110).

In an embodiment, the device that executes the voice order session manager is a server 110 that is separate from any given retail server 120.

In an embodiment, the retail server 130 executes the voice order session manager 200.

At 210, the voice order session manager 200 detects a presence of a customer at a device 140.

In an embodiment, at 211, the voice order session manager 200 receives a notification from session/order agent 143 of device 140 indicating the presence of the customer at the device 140.

In an embodiment, at 212, the voice order session manager 200 evaluates sensor data captured by or captured in proximity to the device 140 and determining the presence of the customer based on the sensor data.

In an embodiment of 212 and at 213, the voice order session manager 200 identifies the sensor data as one or more of motion data captured by a motion sensor, image data captured by a camera, and audio data captured by a microphone.

At 220, the voice order session manager 200 initiates a natural-language dialogue with the customer during a voice session based on the presence of the customer at the device 140.

In an embodiment, at 221, the voice order session manager 200 plays an auto-generated voice greeting over a speaker associated with the device 140 to initiate the natural-language dialogue for the voice session.

In an embodiment of 221 and at 222, the voice order session manager 200 obtains an order number for the order from a transaction system 133 using the API 115.

At 230, the voice order session manager 200 translates voice statements of the customer during the voice session to order details of an order.

In an embodiment of 222 and 230, at 231, the voice order session manager 200 passes each voice statement to a voice-to-text translation service and receives a text sentence for the corresponding voice statement back from the voice-to-text translation service.

In an embodiment of 231 and at 232, the voice order session manager 200 maps select text in each of the text sentences to a command recognized by the transaction system 133 and instructs the transaction system 133 to process the corresponding command using the API 115.

In an embodiment of 232 and at 233, the voice order session manager 200 receives text results from the transaction system 133 based on the transaction system 133 processing the corresponding command using the API 115.

In an embodiment of 233 and at 234, the voice order session manager 200 generates speech data for the text results and plays the speech data over the speaker of device 140.

At 240, the voice order session manager 200 places the order with the transaction system 133 associated with the device 140 based on the order details.

In an embodiment, at 250, the voice order session manager 200 receives an image of a QR code captured by a camera associated with device 140 off a display of a customer-operated device 120. The voice order session manager decodes the QR code to obtain a registered identifier for the customer and the voice order session manager uses the registered identifier to obtain a registered payment card of the customer. The voice order session manager provides payment details for the registered payment card to the transaction system 133 using the API 115 for the transaction system 133 to process and obtain a payment form the customer for the order.

In an embodiment, at 260, the voice order session manager 200 receives an image of a QR code captured by a camera associated with device 140 off a display of a customer-operated device 120. The voice order session manager provides the image to the transaction system 133 for the transaction system 133 to decode the QR code, link decoded information of the QR code to a loyalty account of the customer, obtain a registered payment card of the customer from the loyalty account, and obtain a payment for the order using the payment details of the registered payment card from a payment service.

Figure 3:
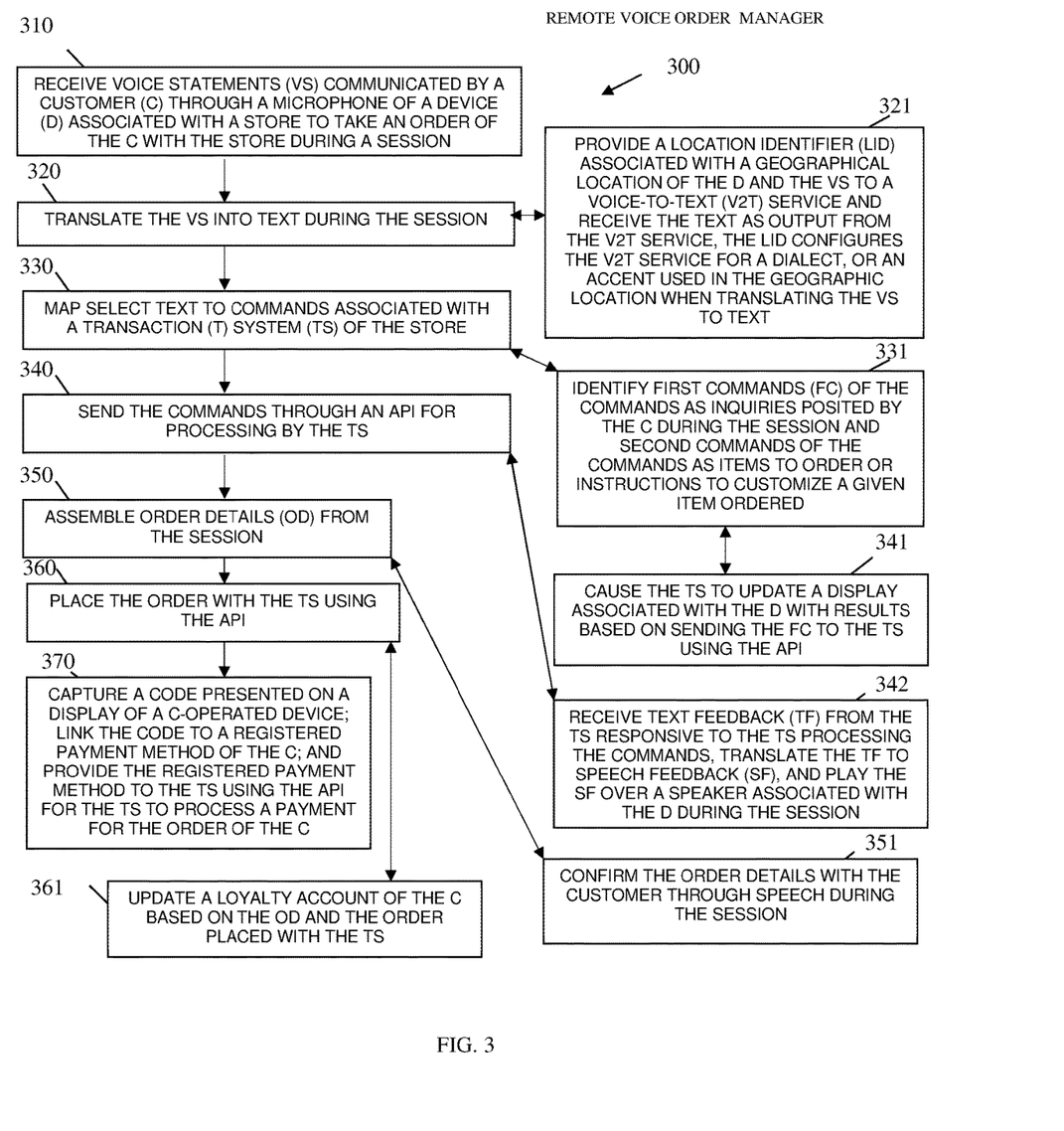
FIG. 3 is a diagram of another method for natural-language based order processing, according to an example embodiment.

FIG. 3 is a diagram of another method 300 for natural-language based order processing, according to an example embodiment. The software module(s) that implements the method 300 is referred to as a "remote voice order manager 300." The remote voice order manager 300 is implemented as executable instructions programmed and residing within memory and/or a non-transitory computer-readable (processor-readable) storage medium 112 and executed by one or more processors 111 of cloud/server 100. The processors 11 that execute the remote voice order manager 300 are specifically configured and programmed for processing the remote voice order manager 300. The remote voice order manager 300 may have access to one or more network connections during its processing. The network connections can be wired, wireless, or a combination of wired and wireless.

In an embodiment, the cloud/server 100 executes the remote voice order manager 110 300.

In an embodiment, the retail server 130 device that executes the remote voice order manager 300.

In an embodiment, the remote voice order manager 300 is all of or some combination of session manager 113, dialogue-API translator 114, API 115, and/or method 200 of FIG. 2.

The remote voice order manager 300 presents another and, in some ways, enhanced processing perspective from that which was discussed above for cloud 100 and method 200.

At 310, the remote voice order manager 300 receives voice statements as speech communicated by a customer through a microphone of a device 140 associated with a store to take an order of the customer with the store during a voice session.

At 320, the remote voice order manager 300 translates the voice statements into text during the voice session.

In an embodiment, at 321, the remote voice order manager 300 provides a location identifier associated with a geographical location of the device 140 and the voice statements to a voice-to-text service and receives the text as output from the voice-to-text service. The location identifier configures the voice-to-text service for a dialect, or an accent used in the geographic location when translating the voice statements to text.

At 330, the remote voice order manager 300 maps select text to commands associated with a transaction system 133 of the store.

In an embodiment, at 331, the remote voice order manager 300 identifies first commands of the commands as inquiries posited by the customer during the voice session and second commands of the commands as items to order or instructions to customize a given item ordered.

At 340, the remote voice order manager 300 sends the commands through the API 115 for processing by the transaction system 133.

In an embodiment of 331 and 340, at 341, the remote voice order manager 300 causes the transaction system 133 to update a display associated with the device 140 with results based on sending the first commands to the transaction system 133 using the API 115.

In an embodiment, at 342, the remote voice order manager 300 receives text feedback from the transaction system 133 processing the commands. The remote voice order manager translates the text feedback to speech feedback and plays the speech feedback over a speaker associated with the device 140 during the voice session.

At 350, the remote voice order manager 300 assembles order details for the order from the voice session.

In an embodiment, at 351, the remote voice order manager 300 confirms the order details with the customer through speech during the voice session.

At 360, the remote voice order manager 300 places the order with the transaction system 133 using the API 115.

In an embodiment, at 361, the remote voice order manager 300 updates a loyalty account of the customer based on the order details and the order placed with the transaction system 133.

In an embodiment, at 370, the remote voice order manager 300 captures a code presented on a display of a customer-operated device 120. The remote voice order manager links a code a registered payment method of the customer and provides the registered payment method to the transaction system 133 using the API 115 for the transaction system 133 to process a payment for the order of the customer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting a presence of a customer at a device equipped with a plurality of peripheral devices including at least a microphone and a speaker, and optionally a camera or a motion sensor;
   initiating a natural-language voice dialogue with the customer during a session based on the detected presence, wherein the natural-language voice dialogue is facilitated by a session manager configured to establish the session via speech captured by the microphone;
   translating voice statements of the customer during the session to order details of an order using a dialogue application programming interface (API) translator that converts audio speech of the customer into text structured sentences or text commands;
   placing the order with a transaction system associated with the device based on the order details, wherein the transaction system interacts with fulfillment terminals at a store to communicate the order and the order details for fulfillment and delivery to the customer; and
   providing a location identifier associated with a geographical location of the device to the dialogue API translator, wherein the location identifier configures the dialogue API translator for a dialect or accent used in the geographical location when translating the voice statements;
   wherein the transaction system is configured to update a display associated with the device with results based on sending commands to the transaction system using the dialogue API translator;
   wherein the display is updated in real-time as the customer provides voice statements during the session to show a visual representation of ordered items;
   wherein the session manager uses the dialogue API translator to instruct the transaction system to begin an order for the customer at the store associated with the device, which causes a menu of items associated with the store to be rendered and presented on the display associated with the device for customer viewing.

2. The method of claim 1, wherein detecting further comprises receiving a notification from an agent of the device indicating the presence of the customer at the device.

3. The method of claim 1, wherein detecting further comprises evaluating sensor data captured by or in proximity to the device and determining the presence based on the sensor data.

4. The method of claim 1, wherein initiating further comprises playing an auto-generated voice greeting over a speaker associated with the device to initiate the natural-language voice dialogue for the session.

5. The method of claim 4, wherein playing further comprises obtaining an order number for the order from the transaction system using an Application Programming Interface (API).

6. The method of claim 5, wherein translating further comprises passing each voice statement to a voice-to-text translation service and receiving a text sentence for a corresponding voice statement.

7. The method of claim 6, wherein passing further comprises mapping select text in each of the text structured sentences to a command recognized by the transaction system and instructing the transaction system to process a corresponding command using the API.

8. The method of claim 7, wherein mapping further comprises receiving text results from the transaction system based on the transaction system processing the corresponding command.

9. The method of claim 8, wherein receiving further comprises generating speech data for the text results and playing the speech data over the speaker associated with the device.

10. The method of claim 1 further comprising:
    receiving an image of a Quick Response (QR) code captured by a camera associated with the device off a display of a customer-operated device;
    decoding the QR code to obtain a registered identifier for the customer;
    using the registered identifier to obtain a registered payment card of the customer; and
    providing registered payment card details for the registered payment card to the transaction system by using the dialogue API translator for obtaining a payment from the customer for the order.

11. The method of claim 1 further comprising:
    receiving an image of a Quick Response (QR) code captured by a camera associated with the device off a display of a customer-operated device; and
    providing the image to the transaction system for the transaction system to decode the QR code, link decoded information of the QR code to a loyalty account of the customer, obtain a registered payment card of the customer from the loyalty account, and obtain a payment for the order using payment card details of the registered payment card.

12. A method, comprising:
    receiving voice statements audibly communicated by a customer through a microphone of a device associated with a store to take an order of the customer with the store during a session;
    translating the voice statements into text during the session using a dialogue application programming interface (API) translator that is configured to convert audio speech of the customer into text structure sentences or text commands;
    wherein translating comprises:
      providing a location identifier associated with a geographical location of the device and the voice statements to a voice-to-text service and receiving the text as output from the voice-to-text service, wherein the location identifier configures the voice-to-text service for a dialect, or an accent used in the geographical location when translating the voice statements into the text;
    mapping select text to commands associated with a transaction system of the store using a session manager that establishes a natural language voice session or dialogue with the customer;

sending the commands through an API for processing by the transaction system;

assembling order details from the session;

placing the order with the transaction system using the API, wherein the transaction system is configured to interact with fulfillment terminals at the store to communicate the order and the order details for fulfillment and delivery to the customer; and establishing the natural language voice session through a cloud processing environment comprising a plurality of servers logically cooperating and accessible as a single server;

wherein the transaction system is configured to update a display associated with the device with results based on sending the commands to the transaction system using the API;

wherein the display is updated in real-time as the customer provides voice statements during the session to show a visual representation of ordered items;

wherein the session manager plays a natural language greeting to the customer over a speaker that welcomes the customer and asks what the customer would like to order today.

13. The method of claim 12 further comprising:

capturing a code presented on a display of a customer-operated device;

linking the code to a registered payment method of the customer; and providing the registered payment method to the transaction system using the API for the transaction system to process a payment for the order of the customer.

14. The method of claim 12, wherein mapping further comprises identifying first commands of the commands as inquiries posited by the customer during the session and second commands of the commands as items to order or instructions to customize a given item ordered.

15. The method of claim 12, wherein sending further comprises receiving text feedback from the transaction system responsive to the transaction system processing the commands, translating the text feedback to speech feedback, and playing the speech feedback over a speaker associated with the device.

16. The method of claim 12, wherein assembling further comprises confirming the order details for the order with the customer through speech during the session.

17. The method of claim 12, wherein placing further comprises updating a loyalty account of the customer based on the order details and the order placed with the transaction system.

18. A system, comprising:

a cloud processing environment comprising at least one server;

the at least one server comprising a processor and a non-transitory computer-readable storage medium;

the non-transitory computer-readable storage medium comprises executable instructions; and the executable instructions when executed on the processor from the non-transitory computer-readable storage medium cause the processor to perform operations comprising:

engaging a customer in a natural-language dialogue at a drive-thru device of a store to take an order of the customer with the store;

translating voice statements of the customer into one or more of an inquiry, an ordered item, and a customization of a given ordered item using a dialogue application programming interface (API) translator that converts audio speech of the customer into text structured sentences or text commands;

providing commands to a transaction system associated with one or more of the inquiry, the ordered item, and the customization of the given ordered item using an API;

translating feedback from the transaction system into automated speech played to the customer over a speaker of the drive-thru device during a session;

confirming order details for the order during the session;

placing the order with the transaction system with the order details using the API, wherein the transaction system is configured to interact with fulfillment terminals at the store to communicate the order and the order details for fulfillment and delivery to the customer, and wherein the transaction system is configured to update a display associated with the drive-thru device with results based on sending the commands to the transaction system using the API; and wherein the cloud processing environment comprises a plurality of servers logically cooperating and accessible as a single server, and wherein a session manager provides a location identifier to the dialogue API translator that configures the dialogue API translator for a dialect or accent used in a geographic location of the store;

wherein the transaction system sends a confirmation back to the session manager and the session manager plays speech over the speaker of the drive-thru device that instructs the customer to pull forward or to pull into a designated parking spot to await delivery of the order.

19. The system of claim 18, wherein the executable instructions further comprise additional executable instructions that further cause the processor to perform additional operations comprising:

capturing a Quick Response (QR) code presented on a display of a customer-operated device at the drive-thru device;

associating the QR code with a payment method registered to the customer; and providing the payment method to the transaction system using the API as a payment made by the customer for the order.

* * * * *